United States Patent
Johnston et al.

(10) Patent No.: US 9,112,840 B2
(45) Date of Patent: Aug. 18, 2015

(54) VERIFYING PRIVACY OF WEB REAL-TIME COMMUNICATIONS (WEBRTC) MEDIA CHANNELS VIA CORRESPONDING WEBRTC DATA CHANNELS, AND RELATED METHODS, SYSTEMS, AND COMPUTER-READABLE MEDIA

(71) Applicant: Avaya Inc., Basking Ridge, NJ (US)

(72) Inventors: Alan B. Johnston, St. Louis, MO (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 157 days.

(21) Appl. No.: 13/944,368

(22) Filed: Jul. 17, 2013

(65) Prior Publication Data

US 2015/0026473 A1 Jan. 22, 2015

(51) Int. Cl.
H04L 29/06 (2006.01)

(52) U.S. Cl.
CPC ........... *H04L 63/061* (2013.01); *H04L 63/0869* (2013.01)

(58) Field of Classification Search
CPC ... H04L 63/061; H04L 63/0869; H04L 63/12; H04L 9/0827; H04L 9/3215; H04L 63/205
See application file for complete search history.

(56) References Cited

U.S. PATENT DOCUMENTS

| | | | |
|---|---|---|---|
| 6,714,967 B1 | 3/2004 | Horvitz | |
| 7,107,316 B2 | 9/2006 | Brown et al. | |
| 7,145,898 B1 | 12/2006 | Elliott | |
| 7,266,591 B1 | 9/2007 | Johnston | |
| 7,379,993 B2 | 5/2008 | Valdes et al. | |
| 7,636,348 B2 | 12/2009 | Bettis et al. | |

(Continued)

FOREIGN PATENT DOCUMENTS

| | | |
|---|---|---|
| EP | 1615386 A1 | 1/2006 |
| EP | 2529316 A2 | 12/2012 |

(Continued)

OTHER PUBLICATIONS

R. Jesup et al., "DTLS Encapsulation of SCTP Packets for RTCWEB" IETF: Network Working Group, Internet Draft, Feb. 16, 2013, pp. 1-6.*

(Continued)

*Primary Examiner* — Eleni Shiferaw
*Assistant Examiner* — Paul Callahan
(74) *Attorney, Agent, or Firm* — Withrow & Terranova, PLLC

(57) ABSTRACT

Verification of privacy of Web Real-Time Communications (WebRTC) media channels via corresponding WebRTC data channels, and related methods, systems, and computer-readable media are disclosed. In this regard, in one embodiment, a method for verifying privacy of a WebRTC media channel comprises establishing the WebRTC media channel between first and second WebRTC clients using a keying material. The method further comprises establishing a corresponding WebRTC data channel between the first and second WebRTC clients using the keying material, and negotiating, in the WebRTC data channel, a cryptographic key exchange. The method also comprises generating a first and a second Short Authentication String (SAS) based on the cryptographic key exchange in the WebRTC data channel. The method further comprises displaying the first SAS and the second SAS, such that a mismatch between the first SAS and the second SAS indicates an existence of a man-in-the-middle (MitM) attacker.

20 Claims, 9 Drawing Sheets

(56) References Cited

U.S. PATENT DOCUMENTS

| | | |
|---|---|---|
| 7,730,309 B2 | 6/2010 | Zimmermann |
| 8,015,484 B2 | 9/2011 | Backer |
| 8,467,308 B2 | 6/2013 | Johnston |
| 8,605,711 B1 | 12/2013 | Sinnreich et al. |
| 8,606,950 B2 | 12/2013 | Glatron et al. |
| 8,695,077 B1 | 4/2014 | Gerhard et al. |
| 8,737,596 B2 | 5/2014 | Kelley et al. |
| 8,832,271 B2 | 9/2014 | McCarty |
| 8,856,236 B2 | 10/2014 | Moore et al. |
| 8,861,692 B1 | 10/2014 | Phelps et al. |
| 8,867,731 B2 | 10/2014 | Lum et al. |
| 2003/0112766 A1 | 6/2003 | Riedel et al. |
| 2003/0131245 A1 | 7/2003 | Linderman |
| 2005/0084082 A1 | 4/2005 | Horvitz et al. |
| 2005/0177380 A1 | 8/2005 | Pritchard et al. |
| 2006/0155814 A1 | 7/2006 | Bennett et al. |
| 2006/0159063 A1 | 7/2006 | Kumar |
| 2007/0083929 A1 | 4/2007 | Sprosts et al. |
| 2007/0143408 A1 | 6/2007 | Daigle |
| 2007/0255662 A1 | 11/2007 | Tumminaro |
| 2007/0283423 A1 | 12/2007 | Bradley et al. |
| 2008/0162642 A1 | 7/2008 | Bachiri et al. |
| 2008/0192646 A1 | 8/2008 | Song et al. |
| 2011/0102930 A1 | 5/2011 | Johnston et al. |
| 2011/0238862 A1 | 9/2011 | Chaturvedi et al. |
| 2012/0001932 A1 | 1/2012 | Burnett et al. |
| 2012/0079031 A1 | 3/2012 | Matthews et al. |
| 2012/0137231 A1 | 5/2012 | Maxfield et al. |
| 2012/0158862 A1 | 6/2012 | Mosko et al. |
| 2013/0002799 A1 | 1/2013 | Mock |
| 2013/0091286 A1 | 4/2013 | Spencer |
| 2014/0013202 A1 | 1/2014 | Schlumberger |
| 2014/0043994 A1 | 2/2014 | Bansal et al. |
| 2014/0095633 A1 | 4/2014 | Yoakum |
| 2014/0095724 A1 | 4/2014 | Yoakum et al. |
| 2014/0108594 A1 | 4/2014 | Siegel et al. |
| 2014/0126708 A1 | 5/2014 | Sayko |
| 2014/0126714 A1 | 5/2014 | Sayko |
| 2014/0161237 A1 | 6/2014 | Tolksdorf |
| 2014/0201820 A1 | 7/2014 | Li et al. |
| 2014/0223452 A1 | 8/2014 | Santhanam et al. |
| 2014/0237057 A1 | 8/2014 | Khodorenko |
| 2014/0245143 A1 | 8/2014 | Saint-Marc |
| 2014/0258822 A1 | 9/2014 | Li et al. |
| 2014/0270104 A1 | 9/2014 | O'Connor |
| 2014/0280734 A1 | 9/2014 | Chaturvedi et al. |
| 2014/0282054 A1 | 9/2014 | Yoakum |
| 2014/0282135 A1 | 9/2014 | Segre |
| 2014/0282399 A1 | 9/2014 | Gorelik et al. |
| 2014/0282903 A1 | 9/2014 | Singh et al. |
| 2014/0344169 A1 | 11/2014 | Phelps et al. |
| 2014/0348044 A1 | 11/2014 | Narayanan et al. |
| 2014/0365676 A1 | 12/2014 | Yoakum |
| 2014/0379931 A1 | 12/2014 | Gaviria |
| 2015/0002619 A1 | 1/2015 | Johnston et al. |
| 2015/0006610 A1 | 1/2015 | Johnston et al. |
| 2015/0006611 A1 | 1/2015 | Johnston et al. |
| 2015/0036690 A1 | 2/2015 | Pastro |
| 2015/0039687 A1 | 2/2015 | Waxman et al. |
| 2015/0039760 A1 | 2/2015 | Yoakum |

FOREIGN PATENT DOCUMENTS

| | | |
|---|---|---|
| GB | 2295747 A | 6/1996 |
| GB | 2468758 A | 9/2010 |
| GB | 2468759 A | 9/2010 |
| WO | 2014060008 A1 | 4/2014 |
| WO | 2014123738 A1 | 8/2014 |
| WO | 2014190094 A1 | 11/2014 |
| WO | 2015032277 A1 | 3/2015 |

OTHER PUBLICATIONS

E. Rescorla, "Security Considerations for RTC-Web", IETF RTCWEB, Internet Draft, Jan. 22, 2013, pp. 1-16.*

E. Rescorla, "WebRTC Security Architecture", IETF RTCWEB, Internet Draft, Jul. 14, 2013, pp. 1-30.*

J. Fischl et al., "Framework for Establishing a Secure Real-time Transport Protocol (SRTP) Security Context Using Datagram Transport Layer Security (DTLS)", Internet Engineering Task Force (IETF), Request for Comments (RFC) 5763, May 2010. pp. 1-37.*

Johnston, Alan et al., "Taking on WebRTC in an Enterprise," IEEE Communications Magazine, Apr. 2013, pp. 48-54, vol. 51, Issue 4.

Search Report for British patent application GB1317121.0 mailed Mar. 14, 2014, 3 pages.

Search Report for British patent application GB1317122.8 mailed Mar. 11, 2014, 3 pages.

Andreasen et al., "Session Description Protocol (SDP): Security Descriptions for Media Streams," Network Working Group, Request for Comments: 4568, Standards Track, The Internet Society, Jul. 2006, 40 pages.

Baugher et al., "The Secure Real-time Transport Protocol (SRTP)," Network Working Group, Request for Comments: 3711, Standards Track, The Internet Society, Mar. 2004, 51 pages.

Johnston et al., "WebRTC: APIs and RTCWEB Protocols of the HTML5 Real-Time Web," (Book), Second Edition, Smashwords Edition, Digital Codex LLC, Jun. 2013, 254 pages.

Many et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.

McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.

Zimmermann et al., "ZRTP: Media Path Key Agreement for Unicast Secure RTP," Internet Engineering Task Force, Request for Comments: 6189, Informational, IETF Trust, Apr. 2011, 102 pages.

Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.

Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.

Berners-Lee, Tim, "Socially Aware Cloud Storage," Notes on web design, Aug. 17, 2009, http://www.w3.org/DesignIssues/CloudStorage.html, 9 pages.

Chandra, Ramesh et al., "Separating Web Applications from User Data Storage with BStore," presented at the USENIX Conference on Web Application Development, Jun. 2010, Boston, Massachusettes, 13 pages.

Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.

Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.

Hsu, F. et al., "Secure File System Services for Web 2.0 Applications," presented at the ACM Cloud Computing Security Workshop, Nov. 13, 2009, Chicago, Illinois, Association for Computing Machinery, 7 pages.

Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.

Vahdat, Amin et al., "WebFS: A Global Cache Coherent File System," UC Berkeley, Dec. 1996, retrieved Sep. 16, 2014 from https://www.cs.duke.edu/~vandat/webfs/webfs.html, 12 pages.

Non-Final Office Action for U.S. Appl. No. 14/037,440, mailed Sep. 12, 2014, 15 pages.

(56) References Cited

OTHER PUBLICATIONS

Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 mailed Dec. 30, 2014, 4 pages.
Search Report for British patent application GB1411580.2 mailed Dec. 30, 2014, 4 pages.
Non-Final Office Action for U.S. Appl. No. 13/931,968, mailed Dec. 8, 2014, 6 pages.
Non-Final Office Action for U.S. Appl. No. 13/835,913, mailed Nov. 20, 2014, 15 pages.
Non-Final Office Action for U.S. Appl. No. 13/803,292, mailed Jan. 27, 2015, 13 pages.
Non-Final Office Action for U.S. Appl. No. 14/050,891, mailed Jan. 29, 2015, 9 pages.
Non-Final Office Action for U.S. Appl. No. 13/955,023, mailed Feb. 2, 2015, 12 pages.
Notice of Allowance for U.S. Appl. No. 13/931,968, mailed Mar. 23, 2015, 7 pages.
Final Office Action for U.S. Appl. No. 13/835,913, mailed Mar. 26, 2015, 17 pages.
Final Office Action for U.S. Appl. No. 14/037,440, mailed Feb. 11, 2015, 19 pages.
Non-Final Office Action for U.S. Appl. No. 14/068,839, mailed Feb. 20, 2015, 15 pages.
Corrected Notice of Allowability for U.S. Appl. No. 13/931,968, mailed Apr. 24, 2015, 4 pages.
Advisory Action for U.S. Appl. No. 14/037,440, mailed May 20, 2015, 3 pages.
Non-Final Office Action for U.S. Appl. No. 13/931,967, mailed May 5, 2015, 10 pages.
Non-Final Office Action for U.S. Appl. No. 13/931,970, mailed May 7, 2015, 9 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Search Report for British Patent Application GB1419338.7, mailed Apr. 27, 2015, 4 pages.
Search Report for British Patent Application GB1419334.6, mailed Apr. 28, 2015, 6 pages.

\* cited by examiner

VERIFYING PRIVACY OF WEB REAL-TIME COMMUNICATIONS (WEBRTC) MEDIA CHANNELS VIA CORRESPONDING WEBRTC DATA CHANNELS, AND RELATED METHODS, SYSTEMS, AND COMPUTER-READABLE MEDIA

BACKGROUND

1. Field of the Disclosure

The technology of the disclosure relates generally to Web Real-Time Communications (WebRTC) interactive sessions.

2. Technical Background

Web Real-Time Communications (WebRTC) represents an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs), such as JavaScript APIs. More information regarding WebRTC may be found in "WebRTC: APIs and RTCWEB Protocols of the HTML5 Real-Time Web," by Alan B. Johnston and Daniel C. Burnett, $2^{nd}$ Edition (2013 Digital Codex LLC), which is incorporated herein in its entirety by reference. WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www.ietf.org.

To establish a WebRTC video, audio, and/or data exchange, two WebRTC clients, such as WebRTC-enabled web browsers, may retrieve WebRTC-enabled web applications from a WebRTC application server. Through the web applications, the two WebRTC clients engage in a WebRTC offer/answer exchange of Session Data Protocol (SDP) objects or other data objects used to describe the WebRTC media and/or data streams to be established via a signaling (i.e., non-media related) channel. The objects are used by the WebRTC clients to communicate and reach an agreement on parameters that define characteristics of the WebRTC interactive session. Once the WebRTC offer/answer exchange is complete, the WebRTC clients may then establish a direct peer connection with one another, and may begin an exchange of media or data packets transporting the real-time communications.

WebRTC requires media packets being exchanged in a real-time interactive media session to be encrypted. Typically, the Secure Real-time Transport Protocol (SRTP), defined in RFC 3711, is used to provide a secure real-time media flow. Two keying mechanisms are currently employed by WebRTC clients to generate a symmetric cryptographic key (i.e., a secret key used by both WebRTC endpoints) to encrypt WebRTC media. The first mechanism, known as SDP Security Descriptions (SDES) and defined in RFC 4568, transmits a key from one WebRTC client to another as part of an SDP object exchanged during a WebRTC offer/answer exchange over a signaling channel, which passes through one or more intermediate servers. Another keying mechanism is Datagram Transport Layer Security for SRTP (DTLS-SRTP), defined in RFC 5764. Instead of including a key during the WebRTC offer/answer exchange, DTLS-SRTP generates or exchanges a key in a media channel separate from the signaling channel used for the WebRTC offer/answer exchange. The most secure approach generates a key based on a Diffie-Hillman (DH) key exchange between the WebRTC clients. Because the key used for encryption is never sent over the signaling channel through intermediate servers, but rather is transmitted directly between the WebRTC clients, DTLS-SRTP offers a higher level of security than SDES.

However, neither SDES nor DTLS-SRTP can guarantee privacy of a WebRTC media channel against a "man-in-the-middle" (MitM) attacker. A MitM attacker may be a third party that eavesdrops on communications between two WebRTC clients by secretly interposing itself in a WebRTC media channel between the WebRTC clients. As illustrated in FIG. 1, a MitM attacker 10 may intercept communications between WebRTC clients 12 and 14 by covertly establishing two WebRTC media channels: a MitM WebRTC media channel 16 for a compromised WebRTC media flow 18 with the WebRTC client 12, and a MitM WebRTC media channel 20 for a compromised WebRTC media flow 22 with the WebRTC client 14. In doing so, the MitM attacker 10 makes it appear that the WebRTC clients 12 and 14 are communicating directly via an apparent WebRTC media flow 24 over an apparent WebRTC media channel 26, when in fact the MitM attacker 10 is secretly eavesdropping on the communications. SDES provides no protection against the MitM attacker 10 because the key intended to encrypt the WebRTC media channel 26 could be intercepted and subsequently stored or changed by the MitM attacker 10. Likewise, DTLS-SRTP alone offers no guarantee of privacy because the MitM attacker 10 could carry out a DH key exchange with each of the WebRTC clients 12 and 14, while making it appear that they are conducting a DH key exchange with each other.

SUMMARY OF THE DETAILED DESCRIPTION

Embodiments disclosed in the detailed description provide verifying privacy of Web Real-Time Communications (WebRTC) media channels via corresponding WebRTC data channels. Related methods, systems, and computer-readable media are also disclosed. In some embodiments, a first WebRTC client and a second WebRTC client include a first WebRTC privacy verification agent and a second WebRTC privacy verification agent, respectively. The first WebRTC client and the second WebRTC client establish a WebRTC media channel using a keying material, such as, for example, public/private cryptographic key pairs. The first WebRTC privacy verification agent and the second WebRTC privacy verification agent then communicate via a WebRTC data channel that is established with the same keying material used to establish the WebRTC media channel (i.e., the same public/private cryptographic key pairs are used for establishing both channels, such that a "fingerprint" or hash of the keying material matches). The first WebRTC privacy verification agent and the second WebRTC privacy verification agent negotiate a cryptographic key exchange via the WebRTC data channel by, for example, exchanging messages based on the ZRTP protocol defined by RFC 6189. Based on the cryptographic key exchange, the first WebRTC privacy verification agent and the second WebRTC privacy verification agent then each generate a Short Authentication String (SAS). If each generated SAS is determined to not match the other (e.g., by displaying each SAS to users of the first and second WebRTC clients, who read the SAS values aloud via the WebRTC media channel to compare), the existence of a man-in-the-middle (MitM) attacker in the WebRTC data channel can be indicated. For additional security, if the SAS values are determined to match, the first WebRTC privacy verification agent and the second WebRTC privacy verification agent may compare the fingerprints used to establish the WebRTC media channel and WebRTC data channel. If the fingerprints do not match, the existence of a MitM attacker in the WebRTC media channel is indicated. Otherwise, the WebRTC media channel is confirmed as private.

In this regard, in one embodiment, a method for verifying privacy of a WebRTC media channel is provided. The method comprises establishing, by a first WebRTC client executing on a first computing device and a second WebRTC client executing on a second computing device, a WebRTC media channel between the first WebRTC client and the second WebRTC client using a keying material. The method further comprises establishing, using the same keying material, a WebRTC data channel between the first WebRTC client and the second WebRTC client corresponding to the WebRTC media channel. The method additionally comprises negotiating, in the WebRTC data channel, a cryptographic key exchange between the first WebRTC client and the second WebRTC client. The method also comprises generating a first SAS and a second SAS based on the cryptographic key exchange in the WebRTC data channel. The method further comprises displaying the first SAS via the first WebRTC client and the second SAS via the second WebRTC client, such that a mismatch between the first SAS and the second SAS indicates an existence of a MitM attacker.

In another embodiment, a system for verifying privacy of a WebRTC media channel is provided. The system comprises at least one communications interface, and first and second computing devices associated with the at least one communications interface. The first computing device comprises a first WebRTC client, comprising a first WebRTC privacy verification agent. The second computing device comprises a second WebRTC client, comprising a second WebRTC privacy verification agent. The first WebRTC client and the second WebRTC client are configured to establish a WebRTC media channel between the first WebRTC client and the second WebRTC client using a keying material. The first WebRTC privacy verification agent and the second WebRTC privacy verification agent are configured to establish, using the same keying material, a WebRTC data channel between the first WebRTC client and the second WebRTC client corresponding to the WebRTC media channel. The first WebRTC privacy verification agent and the second WebRTC privacy verification agent are further configured to negotiate, in the WebRTC data channel, a cryptographic key exchange between the first WebRTC client and the second WebRTC client. The first WebRTC privacy verification agent and the second WebRTC privacy verification agent are additionally configured to generate a first SAS and a second SAS based on the cryptographic key exchange in the WebRTC data channel. The first WebRTC privacy verification agent and the second WebRTC privacy verification agent are also configured to display the first SAS via the first WebRTC client and the second SAS via second WebRTC client, such that a mismatch between the first SAS and the second SAS indicates an existence of a MitM attacker.

In another embodiment, a non-transitory computer-readable medium is provided. The non-transitory computer-readable medium has stored thereon computer-executable instructions to cause a processor to implement a method comprising establishing a WebRTC media channel between a first WebRTC client and a second WebRTC client using a keying material. The method implemented by the computer-executable instructions further comprises establishing, using the same keying material, a WebRTC data channel between the first WebRTC client and the second WebRTC client corresponding to the WebRTC media channel. The method implemented by the computer-executable instructions additionally comprises negotiating, in the WebRTC data channel, a cryptographic key exchange between the first WebRTC client and the second WebRTC client. The method implemented by the computer-executable instructions also comprises generating a first SAS and a second SAS based on the cryptographic key exchange in the WebRTC data channel. The method implemented by the computer-executable instructions further comprises displaying the first SAS via the first WebRTC client and the second SAS via the second WebRTC client, such that a mismatch between the first SAS and the second SAS indicates an existence of a MitM attacker.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
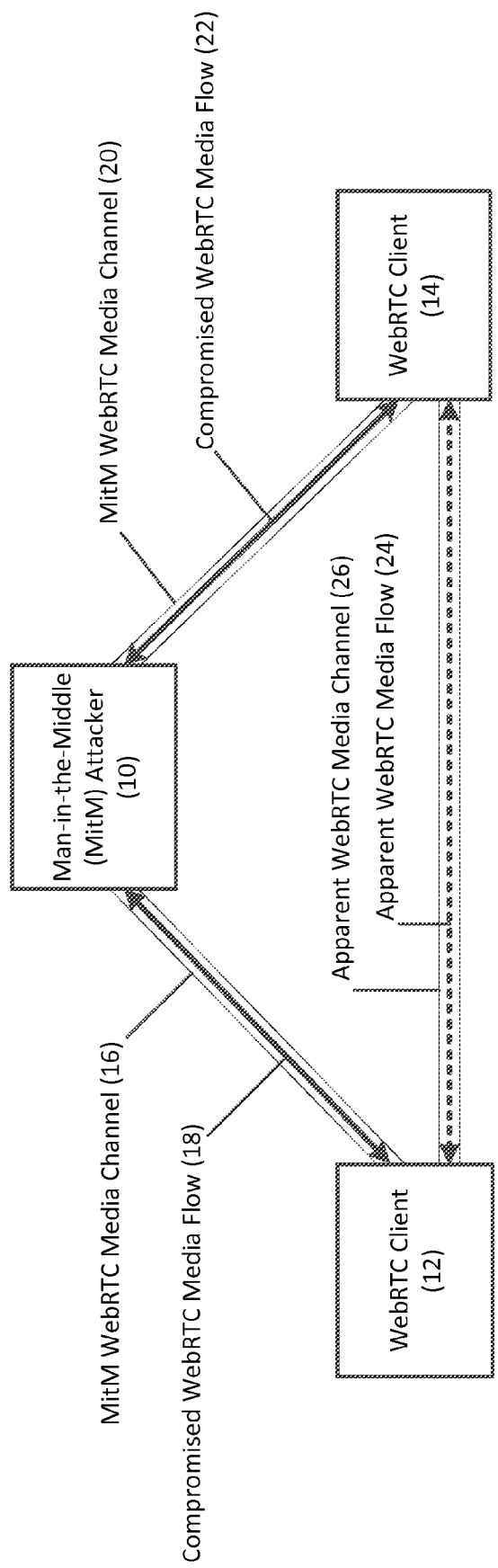
FIG. 1 is a conceptual diagram illustrating compromised Web Real-Time Communications (WebRTC) media communications between two WebRTC clients, where a man-in-the-middle (MitM) attacker is present.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide verifying privacy of Web Real-Time Communications (WebRTC) media channels via corresponding WebRTC data channels. Related methods, systems, and computer-readable media are also disclosed. In some embodiments, a first WebRTC client and a second WebRTC client include a first WebRTC privacy verification agent and a second WebRTC privacy verification agent, respectively. The first WebRTC client and the second WebRTC client establish a WebRTC media channel using a keying material, such as, for example, public/private cryptographic key pairs. The first WebRTC privacy verification agent and the second WebRTC privacy verification agent then communicate via a WebRTC data channel that is established with the same keying material used to establish the WebRTC media channel (i.e., the same public/ private cryptographic key pairs are used for establishing both channels, such that a "fingerprint" or hash of the keying material matches). The first WebRTC privacy verification agent and the second WebRTC privacy verification agent negotiate a cryptographic key exchange via the WebRTC data channel by, for example, exchanging messages based on the ZRTP protocol defined by RFC 6189. Based on the cryptographic key exchange, the first WebRTC privacy verification agent and the second WebRTC privacy verification agent then each generate a Short Authentication String (SAS). If each generated SAS is determined to not match the other (e.g., by displaying each SAS to users of the first and second WebRTC clients, who read the SAS values aloud via the WebRTC media channel to compare), the existence of a man-in-the-middle (MitM) attacker in the WebRTC data channel can be indicated. For additional security, if the SAS values are determined to match, the first WebRTC privacy verification agent and the second WebRTC privacy verification agent may compare the fingerprints used to establish the WebRTC media channel and WebRTC data channel. If the fingerprints do not match, the existence of a MitM attacker in the WebRTC media channel is indicated. Otherwise, the WebRTC media channel is confirmed as private.

In this regard, in one embodiment, a method for verifying privacy of a WebRTC media channel is provided. The method comprises establishing, by a first WebRTC client executing on a first computing device and a second WebRTC client executing on a second computing device, a WebRTC media channel between the first WebRTC client and the second WebRTC client using a keying material. The method further comprises establishing, using the same keying material, a WebRTC data channel between the first WebRTC client and the second WebRTC client corresponding to the WebRTC media channel. The method additionally comprises negotiating, in the WebRTC data channel, a cryptographic key exchange between the first WebRTC client and the second WebRTC client. The method also comprises generating a first SAS and a second SAS based on the cryptographic key exchange in the WebRTC data channel. The method further comprises displaying the first SAS via the first WebRTC client and the second SAS via the second WebRTC client, such that a mismatch between the first SAS and the second SAS indicates an existence of a MitM attacker.

Figure 2:
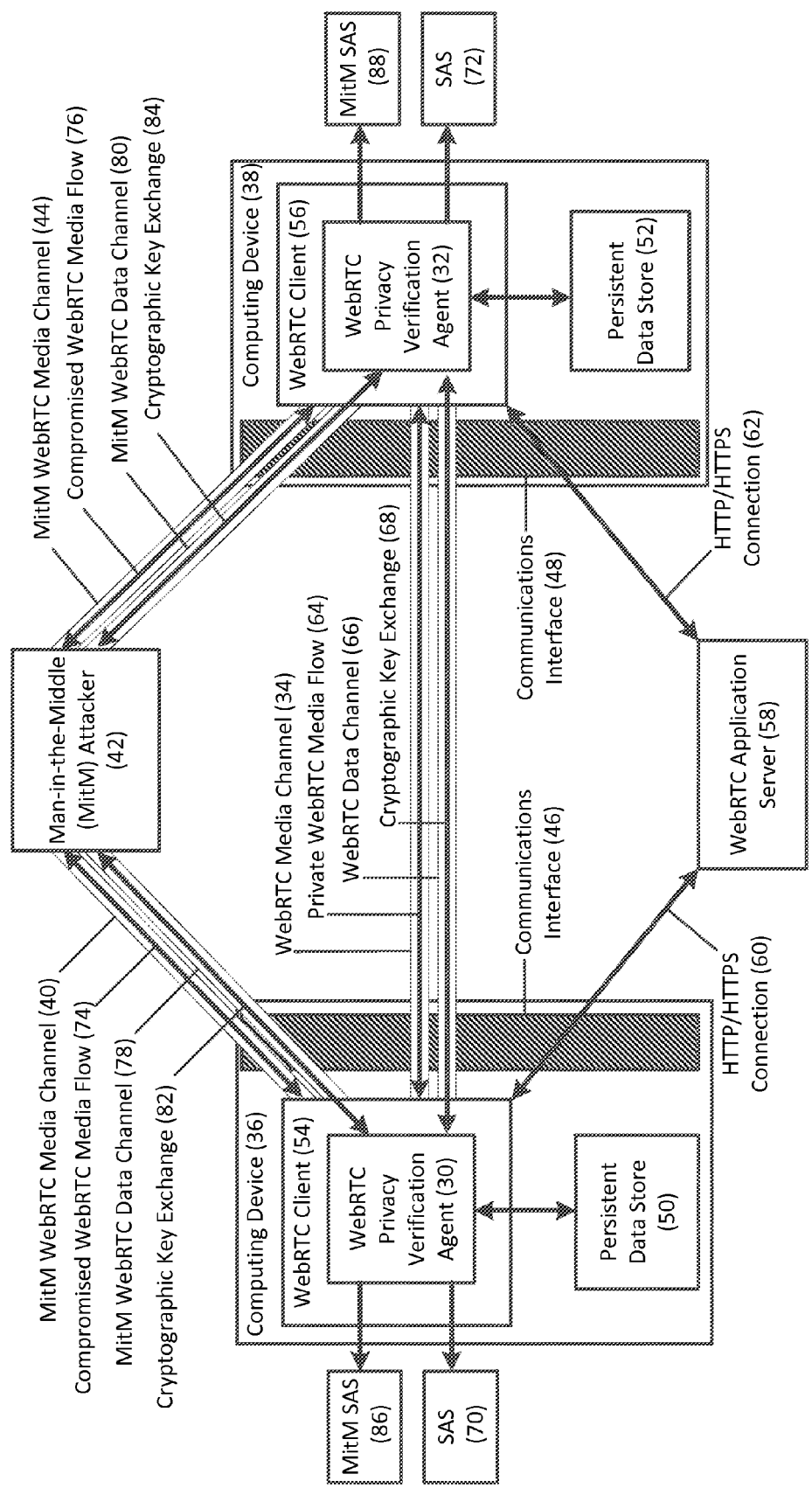
FIG. 2 is a conceptual diagram illustrating an exemplary topology of a WebRTC interactive session between two WebRTC clients, each including a WebRTC privacy verification agent for verifying privacy of a WebRTC media channel via a corresponding WebRTC data channel.

As discussed above, FIG. 1 illustrates a MitM attack, in which the MitM attacker 10 covertly eavesdrops on communications between the WebRTC clients 12 and 14 while making it appear as though the WebRTC clients 12 and 14 are communicating directly with each other. Both Session Description Protocol (SDP) Security Descriptions (SDES) and Datagram Transport Layer Security for SRTP (DTLS-SRTP), two keying mechanisms used to generate cryptographic keys for encrypting WebRTC media channels, may be susceptible to MitM attacks. Accordingly, FIG. 2 illustrates an exemplary WebRTC interactive system 28 providing verification of privacy of a WebRTC media channel via a corresponding WebRTC data channel as disclosed herein. In particular, the exemplary WebRTC interactive system 28 provides WebRTC privacy verification agents 30 and 32. The WebRTC privacy verification agents 30 and 32 handle negotiation of a cryptographic key exchange within a WebRTC data channel, and generation of SAS values for detecting a MitM attack.

As used herein, a "WebRTC media channel" refers to a connection between two WebRTC clients for securely exchanging video and/or audio media, while a "WebRTC data channel" refers to a connection between two WebRTC clients for exchanging binary data in one or more arbitrary formats.

It is to be understood that a WebRTC media channel and a WebRTC data channel may be multiplexed over a single peer connection between the WebRTC clients and/or may be associated with the same User Datagram Protocol (UDP) port of the WebRTC clients. A "WebRTC media flow," as referenced herein, refers to video and/or audio data packets passing over a WebRTC media channel. As non-limiting examples, a WebRTC media flow may include a real-time audio stream and/or a real-time video stream, or other real-time media or data streams.

For purposes of illustration, the operation of the WebRTC privacy verification agents 30 and 32 is discussed with respect to a WebRTC media channel 34 established between computing devices 36 and 38, a MitM WebRTC media channel 40 established between the computing device 36 and a MitM attacker 42, and a MitM WebRTC media channel 44 established between the computing device 38 and the MitM attacker 42. It is to be understood that the computing devices 36 and 38 may both be located within a same public or private network, or may be located within separate, communicatively coupled public or private networks. Some embodiments of the WebRTC interactive system 28 of FIG. 2 may provide that each of the computing devices 36 and 38 may be any computing device having network communications capabilities, such as a smartphone, a tablet computer, a dedicated web appliance, a media server, a desktop or server computer, or a purpose-built communications device, as non-limiting examples. The computing devices 36 and 38 include communications interfaces 46 and 48, respectively, for connecting the computing devices 36 and 38 to one or more public and/or private networks. The computing devices 36 and 38 also include persistent data stores 50 and 52, respectively, for providing persistent data storage that is accessible to the computing devices 36 and 38. The persistent data stores 50 and 52 each may be, for instance, a data storage device. In some embodiments, the elements of the computing devices 36 and 38 may be distributed across more than one computing device 36, 38.

The computing devices 36 and 38 of FIG. 2 include WebRTC clients 54 and 56, respectively. The WebRTC clients 54 and 56 each may be a WebRTC-enabled web browser application, a dedicated communications application, a mobile application, or an interface-less application, such as a daemon or service application, as non-limiting examples. The WebRTC clients 54 and 56 implement the protocols, codecs, and Application Programming Interfaces (APIs) necessary to enable WebRTC media and data channels between the WebRTC clients 54 and 56.

To establish communications via WebRTC, the WebRTC clients 54 and 56 of FIG. 2 download WebRTC web applications (not shown) from a WebRTC application server 58 via Hyper Text Transfer Protocol (HTTP)/Hyper Text Transfer Protocol Secure (HTTPS) connections 60 and 62, respectively. In the example of FIG. 2, the HTTP/HTTPS connections 60 and 62 may constitute signaling channels for establishing the WebRTC media and/or data channels. In some embodiments, each of the WebRTC web applications may comprise an HTML5/JavaScript web application that provides a rich user interface using HTML5, and uses JavaScript to handle user input and to communicate with the WebRTC application server 58. The WebRTC clients 54 and 56 then engage in a WebRTC offer/answer exchange by exchanging WebRTC Session Description Protocol (SDP) objects (not shown) via the WebRTC application server 58 or another media negotiation method. The exchanged WebRTC SDP objects are used to determine the media types and capabilities for the desired WebRTC interactive session. After the WebRTC offer/answer exchange is complete, the WebRTC media channel 34 is established directly between the WebRTC clients 54 and 56 via a peer connection.

As noted above, to secure the WebRTC media channel 34, a keying mechanism is used during establishment of the WebRTC media channel 34 to generate a keying material (e.g., a cryptographic key and/or a hash generated based on a cryptographic key) for each of the WebRTC clients 54 and 56 to use for encrypting media packets for a private WebRTC media flow 64. As non-limiting examples, the keying mechanism may be SDES or DTLS-SRTP. When SDES is used, the keying material for each of the WebRTC clients 54 and 56 is sent as part of the WebRTC offer/answer exchange. If DTLS-SRTP is used, a Diffie-Hellman (DH) exchange is carried out between the WebRTC clients 54 and 56, and each of the WebRTC clients 54 and 56 generates the keying material based on the DH exchange. It is to be understood that a DH exchange may be any variant of DH, including, for example, the classic finite field DH approach as well as the elliptic curve DH approach.

In the example of FIG. 2, users (not shown) of the WebRTC clients 54 and 56 wish to verify the privacy of the WebRTC media channel 34 by ensuring that the MitM attacker 42 is not secretly eavesdropping on the WebRTC media channel 34. Accordingly, a WebRTC data channel 66 is established between the WebRTC privacy verification agent 30 of the WebRTC client 54 and the WebRTC privacy verification agent 32 of the WebRTC client 56. In some embodiments, the WebRTC data channel 66 may have been established prior to the WebRTC media channel 34, while some embodiments may provide that the WebRTC data channel 66 is established subsequent to the establishment of the WebRTC media channel 34. The WebRTC data channel 66 is established using the same keying material as was used to establish the WebRTC media channel 34, and thus the fingerprints (not shown) exchanged over the signaling channel (e.g., the HTTP/HTTPS connections 60, 62) should be the same.

The WebRTC privacy verification agents 30 and 32 then negotiate a cryptographic key exchange 68 in the WebRTC data channel 66. The cryptographic key exchange 68 between the WebRTC privacy verification agents 30 and 32 may be based on any suitable public key cryptographic algorithm or mechanism. As a non-limiting example, the cryptographic key exchange 68 may include a DH key exchange. In some embodiments, the cryptographic key exchange 68 between the WebRTC privacy verification agents 30 and 32 may be carried out by exchanging messages based on the ZRTP protocol defined by RFC 6189. Some embodiments may provide that the cryptographic key exchange 68 is authenticated based on the keying material used to establish the WebRTC media channel 34 and the WebRTC data channel 66, and/or by a digital signature provided by a trusted third party known as an Identity Provider (not shown).

The WebRTC privacy verification agents 30 and 32 generate a SAS 70 and a SAS 72, respectively, based on the cryptographic key exchange 68 in the WebRTC data channel 66. In some embodiments, the SAS 70 and the SAS 72 are short (e.g., 8-bit or 16-bit) values that may be generated according to the ZRTP protocol modified to include local and remote fingerprints, as a non-limiting example. The SAS 70 and the SAS 72 may be based on cryptographic key material (not shown) that is generated as part of the cryptographic key exchange 68, and/or may be generated based on the keying material used to establish the WebRTC media channel 34 and the WebRTC data channel 66.

In some embodiments, the SAS 70 and/or the SAS 72 are calculated as described in RFC 6189, but with an additional hash of a fingerprint included. For example, the standard SAS calculation as described in Section 4.5.3 in RFC 6189 is sashash=KDF(s0, "SAS", KDF_Context, 256). In contrast, an exemplary SAS according to some embodiments disclosed herein may be sashash=KDF(s0, Fingerprints, KDF_Context, 256), where Fingerprints represents a concatenation of a fingerprint of a ZRTP initiator, a colon (":"), and a fingerprint of a ZRTP responder. It is to be understood that the exemplary SAS 70 and/or 72 described above is a non-limiting example of how a fingerprint pair could be included in an SAS hash. Operations for generating the SAS 70 and/or the SAS 72 may include any mechanism for which different fingerprints result in different SAS hashes, and that is used by both of the WebRTC privacy verification agents 30 and 32 to calculate the SAS 70 and the SAS 72, respectively.

If the communications between the WebRTC clients 54 and 56 are being routed through the MitM attacker 42, any SAS pair generated by the WebRTC privacy verification agents 30 and 32 will be based on different cryptographic key material and/or keying material, and consequently will not match. For example, assume that the WebRTC clients 54 and 56 are not communicating directly with each other, but instead have unknowingly established the MitM WebRTC media channels 40 and 44, respectively, and corresponding compromised WebRTC media flows 74 and 76 with the MitM attacker 42. When attempting to verify the privacy of the WebRTC media communications, the WebRTC privacy verification agents 30 and 32 will establish respective MitM WebRTC data channels 78 and 80, and will negotiate separate cryptographic key exchanges 82 and 84. Based on the cryptographic key exchange 82, the WebRTC privacy verification agent 30 will generate a MitM SAS 86. Likewise, the WebRTC privacy verification agent 32 will generate a MitM SAS 88 based on the cryptographic key exchange 84. Because the MitM SAS 86 and the MitM SAS 88 are generated based on different cryptographic key exchanges 82, 84, they will not match, thus indicating the presence of the MitM attacker 42.

However, if the WebRTC clients 54 and 56 are in fact communicating directly with each other, the SAS 70 and the SAS 72 are generated in the same fashion based on the same cryptographic key material and/or the same keying material used to establish the WebRTC media channel 34 and the WebRTC data channel 66. Consequently, the SAS 70 and the SAS 72 generated by the WebRTC privacy verification agents 30 and 32 will match, indicating that there is no MitM attacker 42 eavesdropping on the WebRTC data channel 66. To facilitate comparison of the SAS 70 and the SAS 72, some embodiments may provide that the SAS 70 and the SAS 72 are displayed via the WebRTC clients 54 and 56 for comparison. For example, in some embodiments, the SAS 70 and the SAS 72 are displayed to users (not shown) of the WebRTC clients 54 and 56, who may then compare the SAS 70 and the SAS 72 by reading them aloud over the WebRTC media channel 34. If the users determine that the SAS 70 and the SAS 72 match, they can be assured that the WebRTC data channel 66 is not being intercepted by the MitM attacker 42.

It is to be understood that whether the WebRTC media channel 34 can be verified as private based on a match between the SAS 70 and the SAS 72 may depend on the keying mechanism used. For example, if the DTLS-SRTP keying mechanism was originally used to generate the cryptographic keys used to establish the WebRTC media channel 34 and the WebRTC data channel 66, and the same keys were used by each WebRTC client 54 and 56 to establish both the WebRTC media channel 34 and the WebRTC data channel 66, the privacy of the WebRTC media channel 34 is assured by a match between the SAS 70 and the SAS 72. The WebRTC privacy verification agents 30 and 32 can confirm the privacy of the WebRTC media channel 34 by comparing a first fingerprint (not shown) corresponding to the keying material for establishing the WebRTC media channel 34 with a second fingerprint (not shown) corresponding to the keying material for establishing the WebRTC data channel 66. If the first and second fingerprints do not match, the existence of the MitM attacker 42 is indicated.

If SDES was used as the keying mechanism, no conclusion regarding the privacy of the WebRTC media channel 34 may be drawn from a match between the SAS 70 and the SAS 72. In this latter scenario, if the SAS 70 and the SAS 72 match, the WebRTC clients 54 and 56 may re-key the WebRTC media channel 34 using cryptographic key material generated during the cryptographic key exchange 68. In this manner, the privacy of the WebRTC media channel 34 may be assured.

Some embodiments may provide that, after a private WebRTC media channel 34 is established as described above, cryptographic key material created during the cryptographic key exchange 68 may be cached by the WebRTC privacy verification agents 30 and 32 for later use. For example, the WebRTC privacy verification agents 30 and 32 may each store a derivation of cryptographic key material on the persistent data store 50 and the persistent data store 52, respectively. In some embodiments, the derivation of cryptographic key material may include a combination or hash of the cryptographic key material from the cryptographic key exchange 68 along with other data to increase security. The cached cryptographic key material may be stored as a cached browser cookie or other data file on the persistent data store 50 and the persistent data store 52. In later WebRTC communication sessions between the WebRTC client 54 and the WebRTC client 56, the cached cryptographic key material may be used to sign the first SAS 70 and the second SAS 72. In this manner, the first SAS 70 and the second SAS 72 may be automatically compared, thus avoiding the need for a verbal comparison by the users.

In some embodiments, functionality of the WebRTC privacy verification agents 30 and 32 may be provided as part of the WebRTC application downloaded from the WebRTC application server 58, and may be implemented in JavaScript or other scripting language. To provide additional assurance that the WebRTC privacy verification agents 30 and 32 are secure from tampering by a potential MitM attacker 42 able to intercept and modify HTML and JavaScript in transit, the WebRTC privacy verification agents 30 and/or 32 may be stored on local media such as a USB flash drive or other portable storage device. The WebRTC privacy verification agents 30 and/or 32 may then be loaded by the WebRTC clients 54 and/or 56 upon execution of the WebRTC application. Some embodiments may provide that each of the WebRTC privacy verification agents 30 and 32 constitute a plug-in or extension of the WebRTC clients 54 and/or 56.

It is to be understood that, in some embodiments, the WebRTC media channel 34 and the WebRTC data channel 66 may be established by the same WebRTC application (not shown) downloaded from the WebRTC application server 58 by the WebRTC clients 54 and 56. As a non-limiting example, the WebRTC application may establish the WebRTC media channel 34, as well as provide the WebRTC privacy verification agents 30 and/or 32 to utilize the WebRTC data channel 66 to verify the privacy of the WebRTC media channel 34. According to some embodiments disclosed herein, a first WebRTC application may establish the WebRTC media channel 34, while a second WebRTC application provides the WebRTC privacy verification agents 30 and/or 32 to verify the privacy of the WebRTC media channel 34 using the WebRTC data channel 66. For instance, users of the WebRTC clients 54 and 56 may establish the WebRTC media channel 34 using a first WebRTC application whose trustworthiness is suspect. Assuming that the WebRTC privacy verification agents 30 and/or 32 have access to the keying material and/or the fingerprints of the keying material used to establish the WebRTC data channel 66 by the first WebRTC application, the users may verify the privacy of the WebRTC media channel 34 using the WebRTC privacy verification agents 30 and/or 32 and the WebRTC data channel 66.

Figure 3:
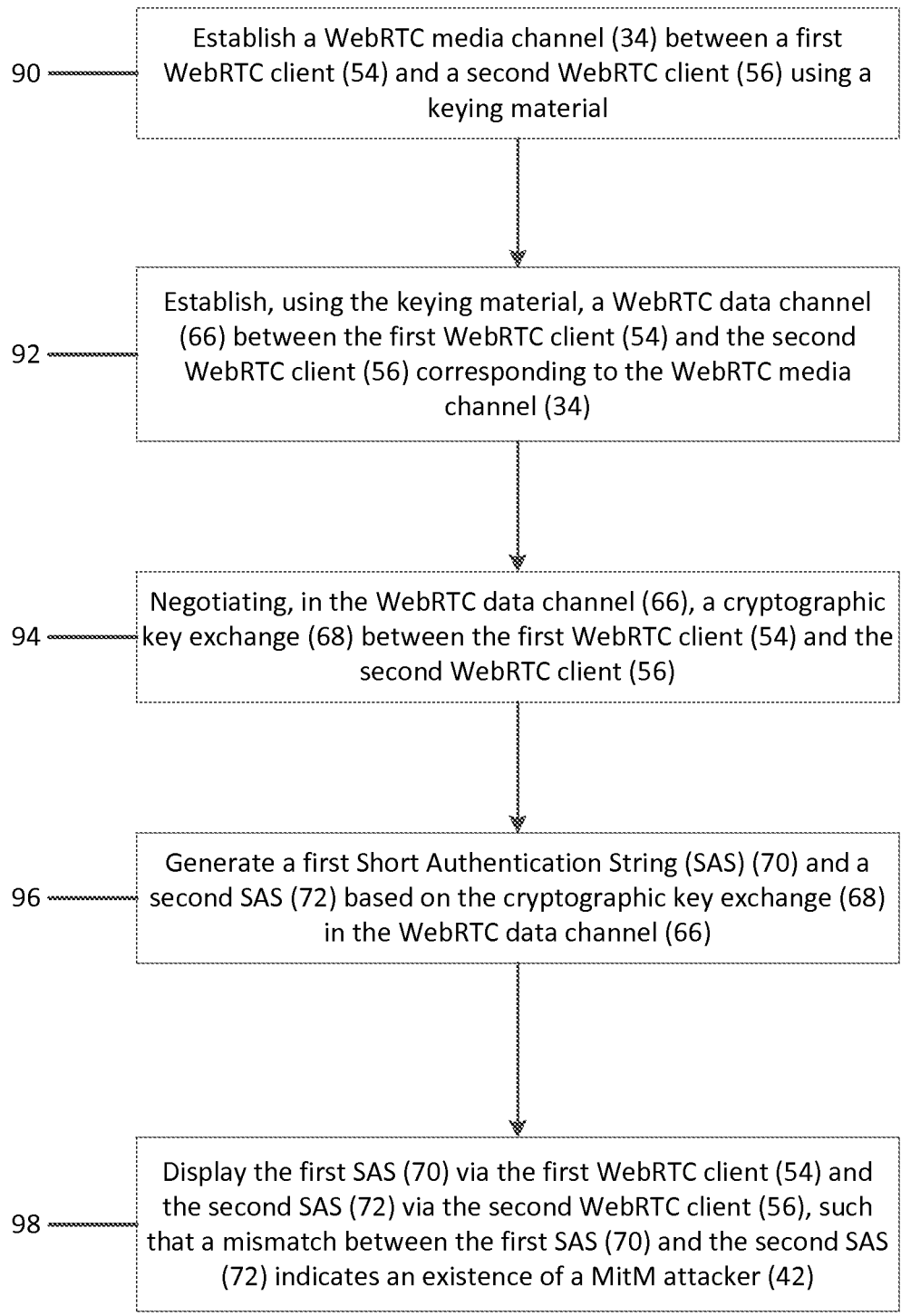
FIG. 3 is a flowchart illustrating exemplary operations for verifying privacy of a WebRTC media channel via a corresponding WebRTC data channel.

To generally describe exemplary operations of the WebRTC clients 54 and 56 and the WebRTC privacy verification agents 30 and 32 of FIG. 2 for verifying the privacy of the WebRTC media channel 34, FIG. 3 is provided. For the sake of clarity, elements of FIG. 2 are referenced in describing FIG. 3. In the example of FIG. 3, operations begin with a first WebRTC client 54 and a second WebRTC client 56 establishing a WebRTC media channel 34 using a keying material (block 90). To establish the WebRTC media channel 34, the WebRTC clients 54 and 56 may download WebRTC web applications from a WebRTC application server 58, and engage in a WebRTC offer/answer exchange. The keying material may be generated using a keying mechanism such as SDES or DTLS-SRTP. The WebRTC privacy verification agents 30 and 32 then establish, using the keying material, a WebRTC data channel 66 between the first WebRTC client 54 and the second WebRTC client 56 corresponding to the WebRTC media channel 34 (block 92).

The WebRTC privacy verification agents 30 and 32 next negotiate, in the WebRTC data channel 66, a cryptographic key exchange 68 between the first WebRTC client 54 and the second WebRTC client 56 (block 94). The cryptographic key exchange 68 between the WebRTC privacy verification agents 30 and 32 may be based on any suitable public key cryptographic algorithm or mechanism that offers perfect forward secrecy, such as a DH key exchange. Some embodiments may provide that the cryptographic key exchange 68 between the WebRTC privacy verification agents 30 and 32 may be carried out by exchanging messages based on the ZRTP protocol defined by RFC 6189 with a suitably modified SAS hash.

The WebRTC privacy verification agents 30 and 32 generate a first SAS 70 and a second SAS 72 based on the cryptographic key exchange 68 in the WebRTC data channel 66 (block 96). According to some embodiments disclosed herein, the SAS 70 and the SAS 72 are short (e.g., 8-bit or 16-bit) values that may be generated according to the ZRTP protocol, as a non-limiting example. The SAS 70 and the SAS 72 may be based on cryptographic key material generated as part of the cryptographic key exchange 68, and/or may be generated based on the keying material used to establish the WebRTC media channel 34 and the WebRTC data channel 66.

The WebRTC privacy verification agents 30 and 32 next display the first SAS 70 via the first WebRTC client 54 and the second SAS 72 via the second WebRTC client 56, such that a mismatch between the first SAS 70 and the second SAS 72 indicates an existence of a MitM attacker 42 (block 98). For example, in some embodiments, the SAS 70 and the SAS 72 are displayed to users of the WebRTC clients 54 and 56, who may then compare the SAS 70 and the SAS 72 by reading them aloud over the WebRTC media channel 34. In this manner, privacy of the WebRTC media channel 34 may be guaranteed against the MitM attacker 42.

Figure 4:
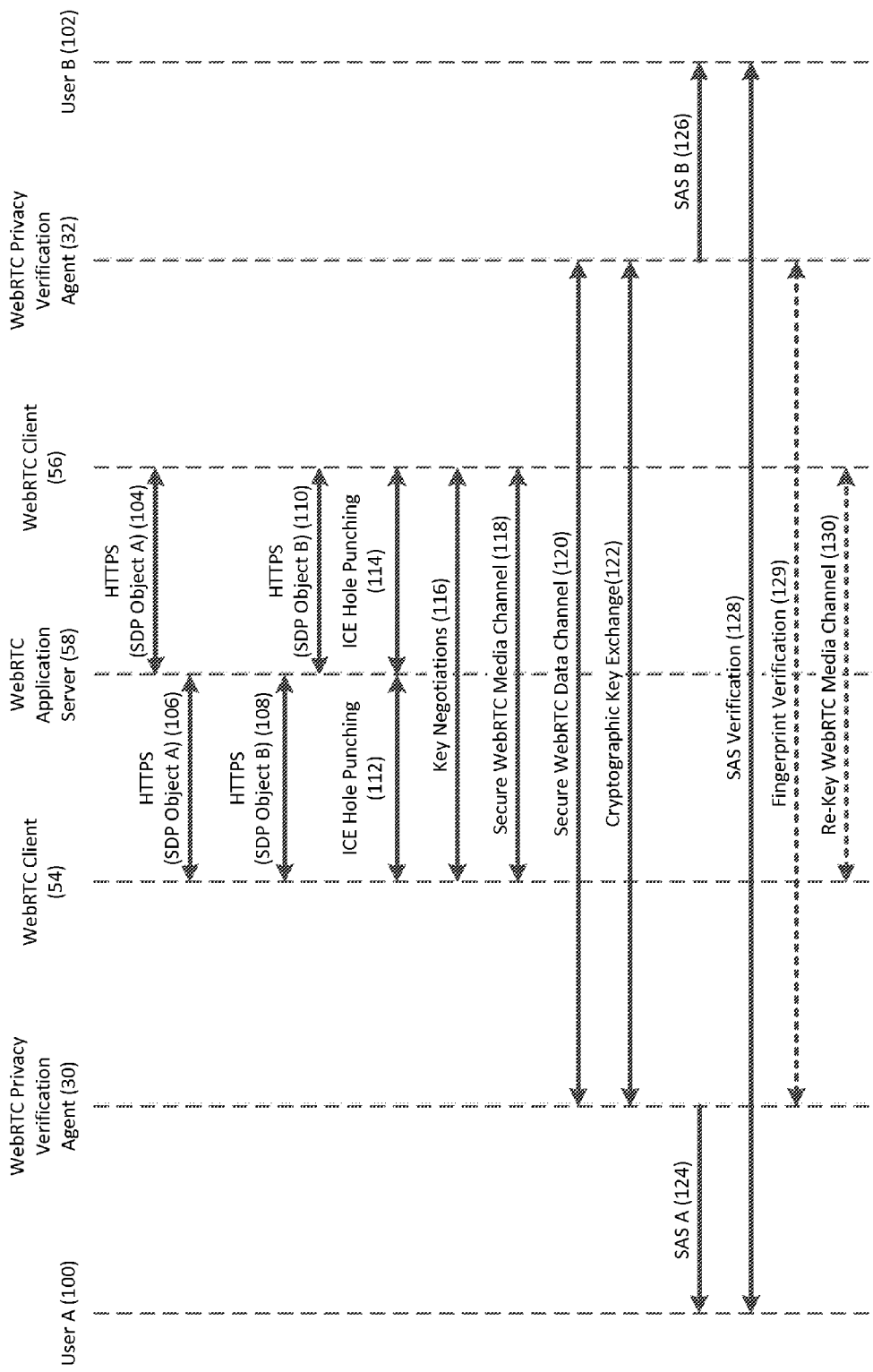
FIG. 4 is a diagram illustrating exemplary communications flows within an exemplary system including the WebRTC privacy verification agents of FIG. 2.

FIG. 4 is provided to illustrate in greater detail exemplary communications flows during verification of the privacy of the WebRTC media channel 34 by the WebRTC privacy verification agents 30 and 32 of FIG. 2. In FIG. 4, a user A 100 of the WebRTC client 54, the WebRTC privacy verification agent 30, the WebRTC client 54, the WebRTC application server 58, the WebRTC client 56, the WebRTC privacy verification agent 32, and a user B 102 of the WebRTC client 56 are each represented by vertical dotted lines. It is assumed for this example that the WebRTC client 54 and the WebRTC client 56 have each downloaded a WebRTC-enabled web application, such as an HTML5/JavaScript WebRTC application, from the WebRTC application server 58.

As seen in FIG. 4, the establishment of a WebRTC media channel begins with the WebRTC client 56 sending an SDP object to the WebRTC application server 58 in an encrypted format (in this example, via an HTTPS connection). In this example, the WebRTC session description object is referred to as SDP Object A and is indicated by bidirectional arrow 104. SDP Object A represents the "offer" in a WebRTC offer/answer exchange. SDP Object A specifies the media types and capabilities that the WebRTC client 56 supports and prefers for use in the WebRTC interactive session. The WebRTC application server 58 then forwards the SDP Object A to the WebRTC client 54 by an HTTPS connection, as indicated by bidirectional arrow 106. In some embodiments, if the DTLS-SRTP keying mechanism is used, the a=fingerprint SDP attribute will be present, and may be used to verify the public key to be used by user B 102 for the DTLS exchange.

After the WebRTC client 54 receives the SDP Object A from the WebRTC application server 58, the WebRTC client 54 in response sends a WebRTC session description object, referred to as SDP Object B, to the WebRTC application server 58, as indicated by bidirectional arrow 108. The SDP Object B in this example represents the "answer" in the WebRTC offer/answer exchange. The WebRTC application server 58, in turn, forwards the SDP Object B to the WebRTC client 56, as shown by bidirectional arrow 110. Some embodiments may provide that if DTLS-SRTP is used as the keying mechanism, the a=fingerprint SDP attribute will be present, and may be used to verify the public key to be used by user A 100 for the DTLS exchange.

With continuing reference to FIG. 4, the WebRTC clients 54 and 56 then begin "hole punching" to determine the best way to establish direct communications. This is indicated by bidirectional arrows 112 and 114 in FIG. 4. Hole punching is a technique, often using protocols such as Interactive Connectivity Establishment (ICE), in which both WebRTC clients 54, 56 establish a connection with an unrestricted third-party server (not shown) that uncovers external and internal address information for use in direct communications. Once the hole punching indicated by arrows 112 and 114 is successful, the WebRTC clients 54 and 56 begin key negotiations to establish a secure peer connection, indicated by bidirectional arrow 116. Upon establishing a secure peer connection, the WebRTC client 54 and the WebRTC client 56 begin exchanging secure media via a secure WebRTC media channel, as shown by bidirectional arrow 118. Establishment of the secure WebRTC media channel is based on a keying material resulting from an SDES or DTLS-SRTP key exchange, as non-limiting examples.

The WebRTC privacy verification agents 30 and 32 then establish a secure WebRTC data channel using the same keying material used for encrypting media packets passed over the secure WebRTC media channel, as indicated by arrow 120. In some embodiments, the WebRTC data channel may have been established prior to the WebRTC media channel, while some embodiments may provide that the WebRTC data channel is established subsequent to the establishment of the WebRTC media channel. The WebRTC privacy verification agents 30 and 32 next negotiate a cryptographic key exchange via the WebRTC data channel, as shown by bidirectional arrow 122. As noted above with respect to FIG. 2, the cryptographic key exchange between the WebRTC privacy verification agents 30 and 32 may be based on any suitable public key cryptographic algorithm or mechanism with perfect forward secrecy, such as a DH key exchange. In some embodiments, the cryptographic key exchange between the WebRTC privacy verification agents 30 and 32 may be carried out by exchanging messages based on the ZRTP protocol defined by RFC 6189.

Based on the cryptographic key exchange, the WebRTC privacy verification agent 30 generates a first SAS, referred to in this example as SAS A, and displays the SAS A to the user A 100, as indicated by arrow 124. Similarly, the WebRTC privacy verification agent 32 generates a second SAS, referred to in this example as SAS B, and displays the SAS B to the user B 102, as indicated by arrow 126. The user A 100 and the user B 102 may then verify whether the SAS A and the SAS B match, as shown by bidirectional arrow 128. In some embodiments, the user A 100 and/or the user B 102 may read an SAS value aloud over the WebRTC media channel and/or provide a visual indication of the SAS value over the WebRTC media channel. If the SAS A displayed to the user A 100 matches the SAS B displayed to the user B 102, then the WebRTC data channel may be assumed to be private. A mismatch between the SAS A and the SAS B would indicate the presence of a MitM attacker in the WebRTC data channel.

In some embodiments, the WebRTC privacy verification agent 30 and the WebRTC privacy verification agent 32 may further compare a fingerprint of the keying material used to establish the WebRTC media channel with a fingerprint of the keying material used to establish the WebRTC data channel, as shown by bidirectional dashed arrow 129. If the fingerprints do not match, then the presence of a MitM attacker in the WebRTC media channel is directly indicated. The WebRTC client 54 and the WebRTC client 56 may also re-key the WebRTC media channel based on the cryptographic key exchange in the WebRTC data channel, as indicated by bidirectional dashed arrow 130, to ensure the privacy of the WebRTC media channel.

Figure 5A:
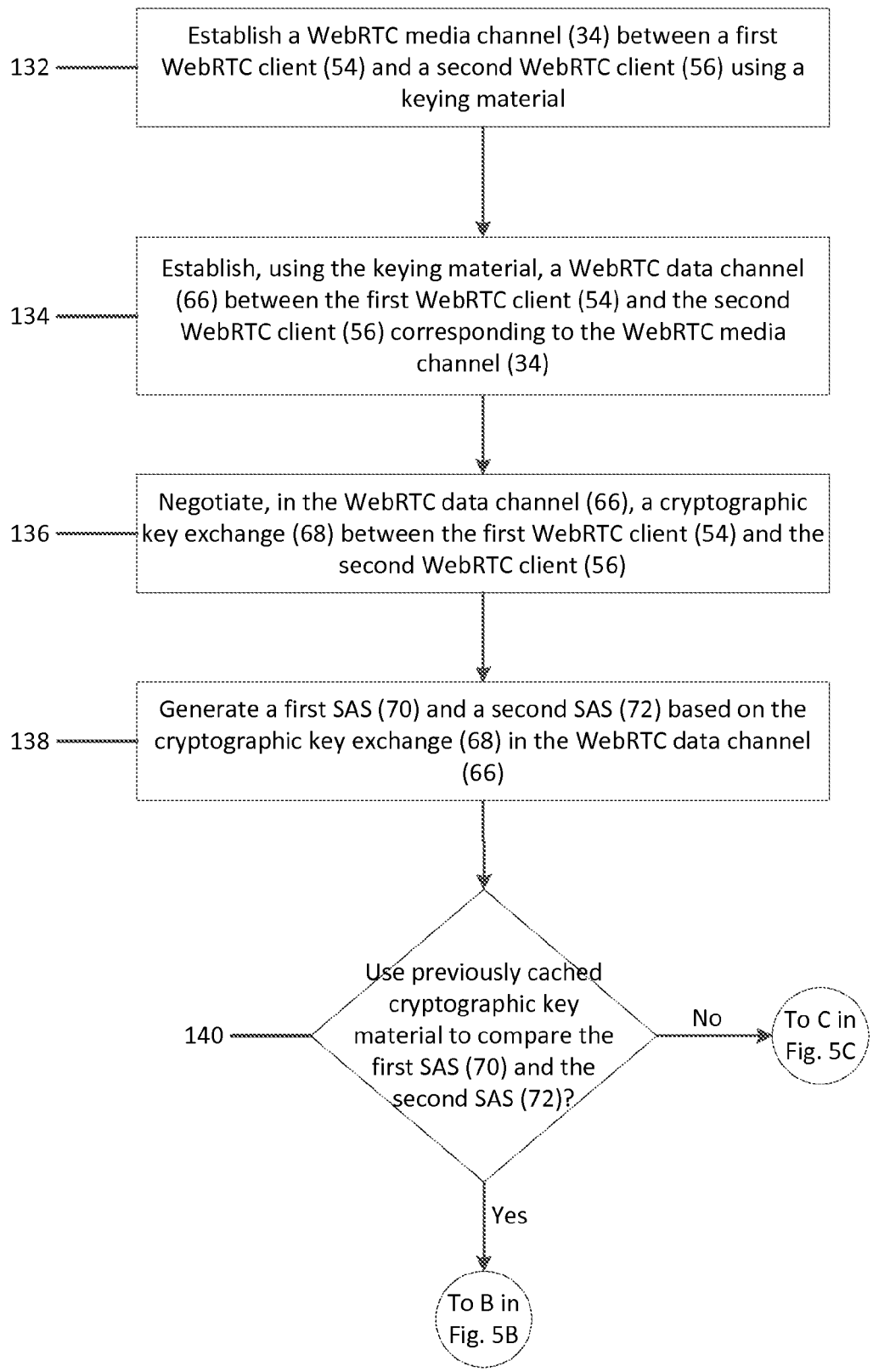
FIGS. 5A-5D are flowcharts illustrating more detailed exemplary operations for privacy verification of a WebRTC media channel via a corresponding WebRTC data channel.
Figure 5B:
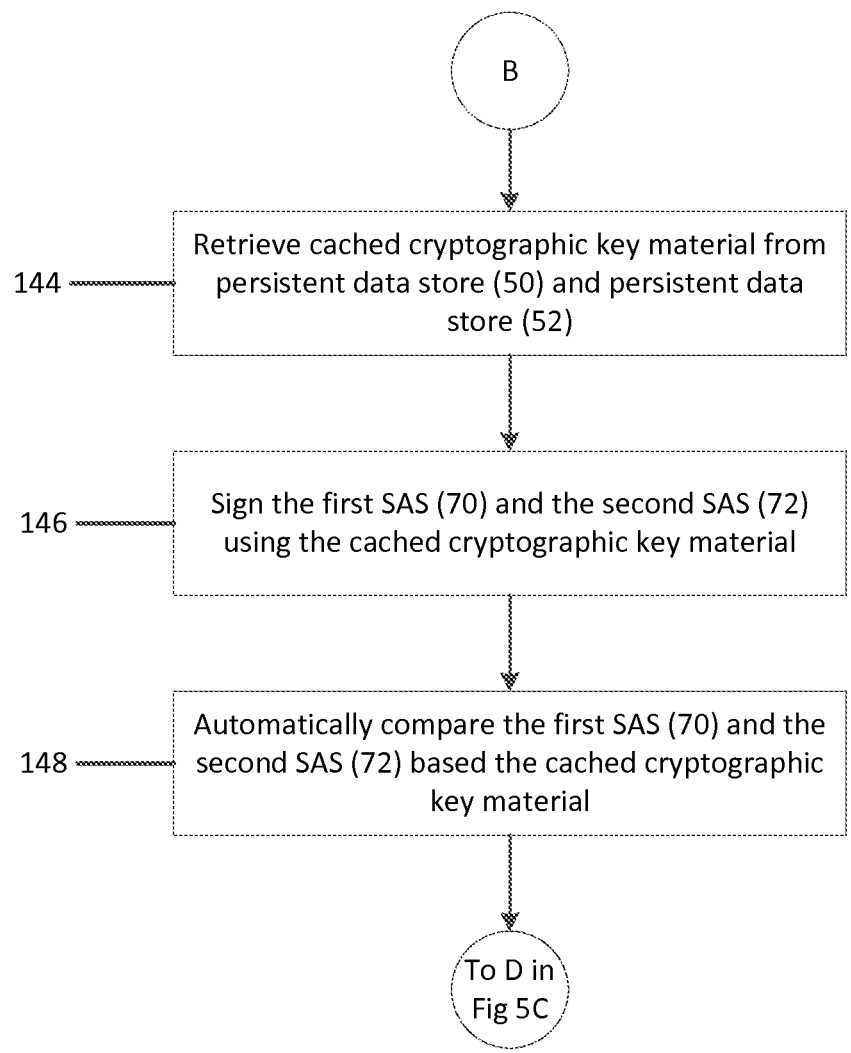
Figure 5C:
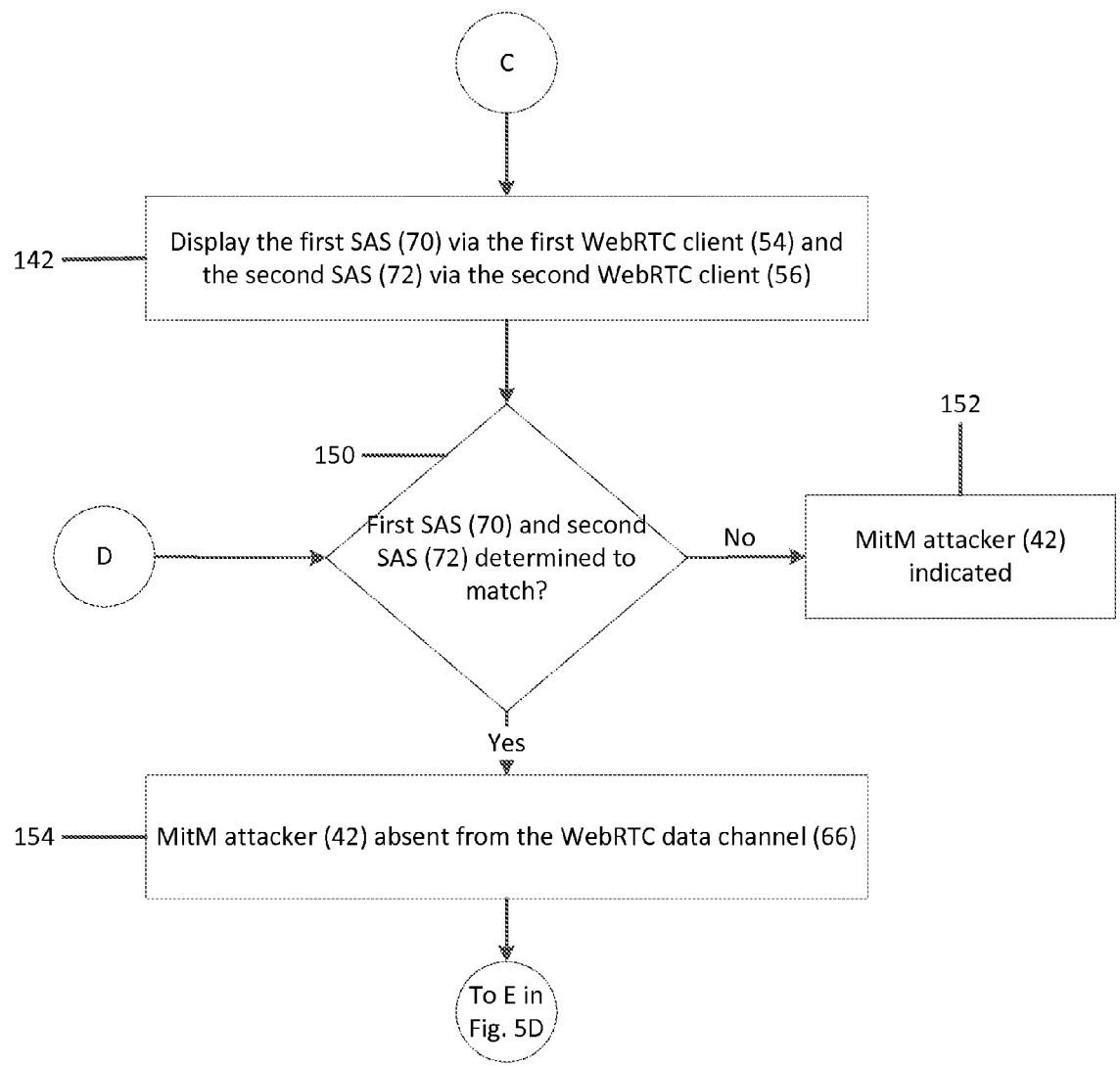
Figure 5D:
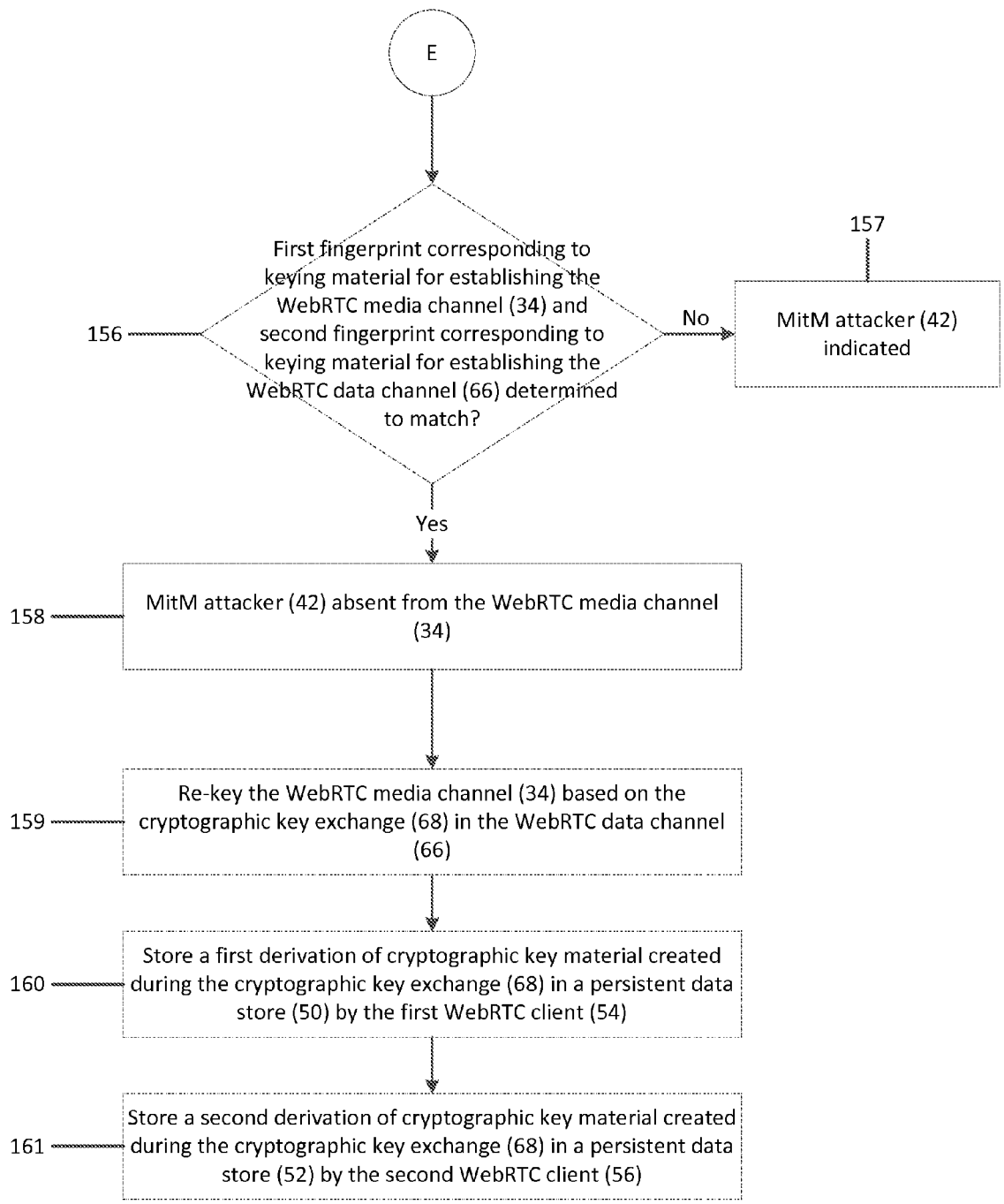

FIGS. 5A-5D are provided to illustrate in greater detail an exemplary generalized process for the WebRTC clients 54 and 56 and the WebRTC privacy verification agents 30 and 32 to verify privacy of the WebRTC media channel 34. For illustrative purposes, FIGS. 5A-5D refer to elements of the exemplary WebRTC interactive system 28 of FIG. 2. FIG. 5A details operations for establishing the WebRTC media channel 34 and the WebRTC data channel 66, negotiating a key exchange via the WebRTC data channel 66, and generating an SAS pair. FIG. 5B illustrates operations for verifying an SAS match using cached cryptographic key material. FIG. 5C shows operations for determining whether a MitM attacker 42 is indicated based on the SAS pair. FIG. 5D illustrates operations for determining the presence of a MitM attacker 42 based on a fingerprint comparison, as well as additional optional functionality.

In FIG. 5A, processing begins with a first WebRTC client 54 and a second WebRTC client 56 establishing a WebRTC media channel 34 using a keying material (block 132). In some embodiments, the keying material may be generated using a keying mechanism such as SDES or DTLS-SRTP, as non-limiting examples. The WebRTC privacy verification agents 30 and 32 then establish, using the keying material, a WebRTC data channel 66 between the first WebRTC client 54 and the second WebRTC client 56 corresponding to the WebRTC media channel 34 (block 134).

The WebRTC privacy verification agents 30 and 32 next negotiate, in the WebRTC data channel 66, a cryptographic key exchange 68 between the first WebRTC client 54 and the second WebRTC client 56 (block 136). The cryptographic key exchange 68 between the WebRTC privacy verification agents 30 and 32 may be based on any suitable public key cryptographic algorithm or mechanism, such as a DH key exchange. Some embodiments may provide that the cryptographic key exchange 68 between the WebRTC privacy verification agents 30 and 32 may be carried out by exchanging messages based on the ZRTP protocol defined by RFC 6189.

The WebRTC privacy verification agents 30 and 32 then generate a first SAS 70 and a second SAS 72 based on the cryptographic key exchange 68 in the WebRTC data channel 66 (block 138). Some embodiments may provide that the SAS 70 and the SAS 72 are short (e.g., 8-bit or 16-bit) values that may be generated according to the ZRTP protocol, as a non-limiting example. The SAS 70 and the SAS 72 may be based on cryptographic key material generated as part of the cryptographic key exchange 68, and/or may be generated based on the keying material used to establish the WebRTC media channel 34 and the WebRTC data channel 66.

The WebRTC privacy verification agents 30 and 32 then determine whether to use previously cached cryptographic key material to compare the first SAS 70 and the second SAS 72 (block 140). For example, cryptographic key material may have been cached during a previous WebRTC media communication, and may be accessible via the persistent data store 50 and the persistent data store 52. If cached cryptographic key material is not to be used (e.g., because cryptographic key material has not been cached before, or one of the WebRTC clients 54, 56 has cleared a cache in which cryptographic key material was stored), processing resumes at block 142 of FIG. 5C. If the WebRTC privacy verification agents 30 and 32 determine that previously cached cryptographic key material is to be used for SAS comparison, processing continues at block 144 of FIG. 5B.

Referring now to FIG. 5B, the WebRTC privacy verification agents 30 and 32 retrieve cached cryptographic key material from the persistent data store 50 and the persistent data store 52, respectively (block 144). In some embodiments, the cached cryptographic key material may be stored on the persistent data store 50 and the persistent data store 52 as browser cookies or other data files. The WebRTC privacy verification agents 30 and 32 sign the first SAS 70 and the second SAS 72 using the cached cryptographic key material (block 146). Each of the WebRTC privacy verification agents 30 and 32 then automatically compares the first SAS 70 and the second SAS 72, respectively, based on the cached cryptographic key material (block 148). Processing then resumes at block 150 of FIG. 5C.

In FIG. 5C, if the WebRTC privacy verification agents 30 and 32 determine at decision block 140 of FIG. 5A that previously cached cryptographic key material is not to be used for SAS comparison, the WebRTC privacy verification agents 30 and 32 display the first SAS 70 via the first WebRTC client 54 and the second SAS 72 via the second WebRTC client 56 (block 142). In this manner, users of the WebRTC clients 54 and 56 may compare the first SAS 70 and the second SAS 72 to determine whether they match. In some embodiments, comparison of the first SAS 70 and the second SAS 72 may be accomplished by the users reading the first SAS 70 and/or the second SAS 72 aloud, or providing a visual indication of the first SAS 70 and/or the second SAS 72 via the WebRTC media channel 34.

Whether the comparison is carried out by users of the WebRTC clients 54 and 56 or is carried out automatically based on signing the first SAS 70 and the second SAS 72 with cached cryptographic values, the WebRTC privacy verification agents 30 and 32 next determine, based on the comparison, whether the first SAS 70 and the second SAS 72 match (block 150). If the first SAS 70 and the second SAS 72 do not match, the presence of a MitM attacker 42 is indicated, and the WebRTC media channel 34 may be assumed to be compromised (block 152). However, if the first SAS 70 and the second SAS 72 match, then a MitM attacker 42 is not present, and the WebRTC data channel 66 may be assumed to be private (block 154). Processing then proceeds to block 156 of FIG. 5D.

As noted above, whether or not the WebRTC media channel 34 can be verified as private based on a match between the first SAS 70 and the second SAS 72 may depend on the keying mechanism used. If the DTLS-SRTP keying mechanism was originally used to generate the cryptographic keys used to establish the WebRTC media channel 34 and the WebRTC data channel 66, and the same keys were used by each WebRTC client 54 and 56 to establish both the WebRTC media channel 34 and the WebRTC data channel 66, the privacy of the WebRTC media channel 34 is assured by a match between the SAS 70 and the SAS 72. Accordingly, as seen in FIG. 5D, the WebRTC privacy verification agents 30 and 32 may compare a first fingerprint corresponding to the keying material for establishing the WebRTC media channel 34 and a second fingerprint corresponding to the keying material for establishing the WebRTC data channel 66 (block 156). If the first fingerprint and the second fingerprint do not match, then the presence of the MitM attacker 42 is indicated on the WebRTC media channel 34 (block 157). If the first fingerprint and the second fingerprint match, then the WebRTC media channel 34 may be assumed to be private (block 158).

If the SDES keying mechanism or another less-secure keying mechanism was used, no conclusion regarding the privacy of the WebRTC media channel 34 may be drawn from a match between the first SAS 70 and the second SAS 72. Thus, the WebRTC privacy verification agents 30 and 32 may optionally re-key the WebRTC media channel 34 based on the cryptographic key exchange 68 in the WebRTC data channel 66 (block 159).

The WebRTC privacy verification agents 30 and 32 may also optionally cache cryptographic key material created during the cryptographic key exchange 68 to automate the comparison of the first SAS 70 and the second SAS 72 during a subsequent WebRTC media communication. To do so, the first WebRTC client 54 may store a first derivation of cryptographic key material created during the cryptographic key exchange 68 in a persistent data store 50 (block 160). Likewise, the second WebRTC client 56 may store a second derivation of cryptographic key material created during the cryptographic key exchange 68 in a persistent data store 52 (block 161). In some embodiments, the first and second derivations of cryptographic key material may include a combination or hash of the cryptographic key material from the cryptographic key exchange 68 along with other data in order to increase security.

Figure 6:
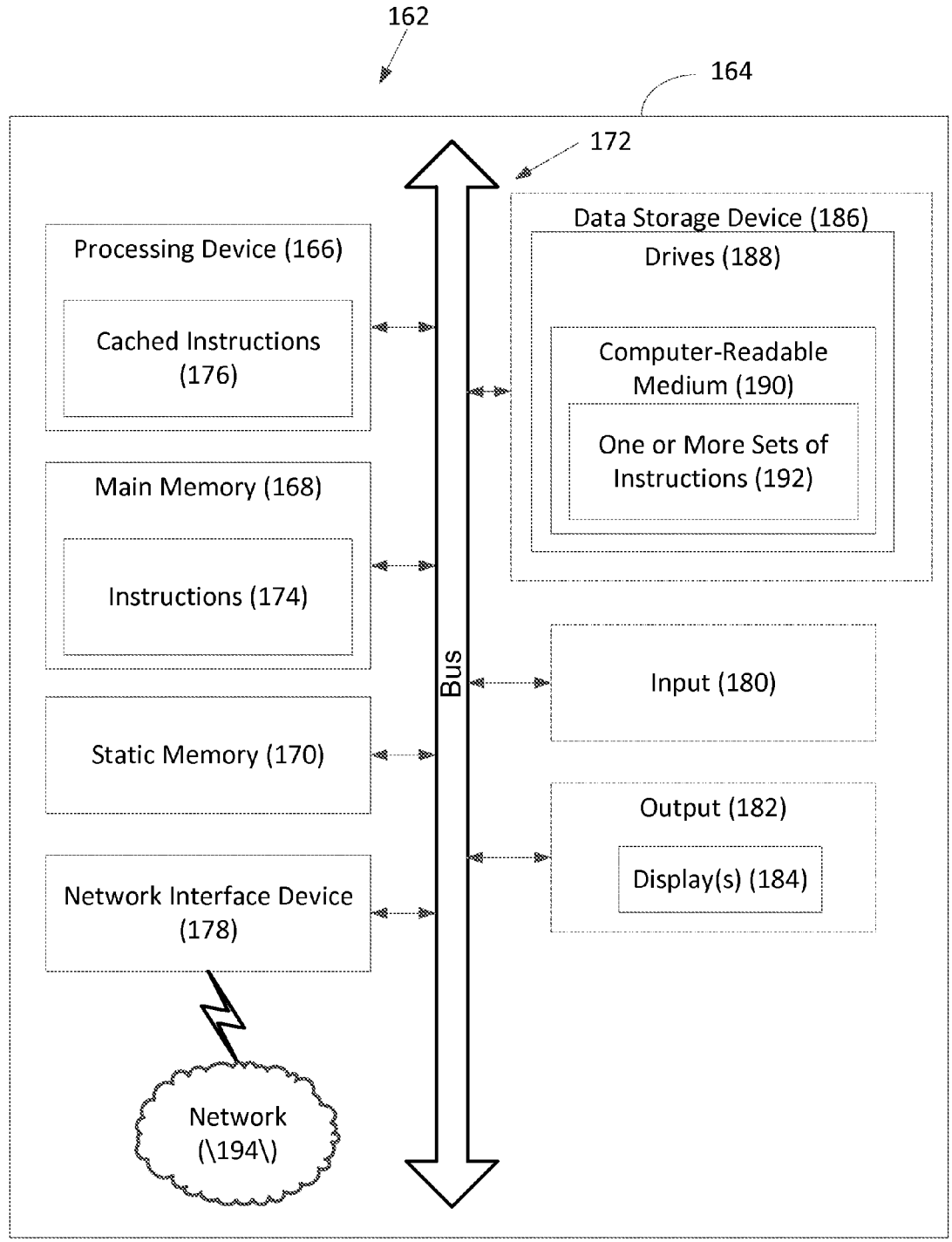
FIG. 6 is a block diagram of an exemplary processor-based system that may include the WebRTC privacy verification agents of FIG. 2.

FIG. 6 provides a schematic diagram representation of a processing system 162 in the exemplary form of an exemplary computer system 164 adapted to execute instructions to perform the functions described herein. In some embodiments, the processing system 162 may execute instructions to perform the functions of the WebRTC clients 54 and 56 and the WebRTC privacy verification agents 30 and 32 of FIG. 2. In this regard, the processing system 162 may comprise the computer system 164, within which a set of instructions for causing the processing system 162 to perform any one or more of the methodologies discussed herein may be executed. The processing system 162 may be connected (as a non-limiting example, networked) to other machines in a local area network (LAN), an intranet, an extranet, or the Internet. The processing system 162 may operate in a client-server network environment, or as a peer machine in a peer-to-peer (or distributed) network environment. While only a single processing system 162 is illustrated, the terms "controller" and "server" shall also be taken to include any collection of machines that individually or jointly execute a set (or multiple sets) of instructions to perform any one or more of the methodologies discussed herein. The processing system 162 may be a server, a personal computer, a desktop computer, a laptop computer, a personal digital assistant (PDA), a computing pad, a mobile device, or any other device and may represent, as non-limiting examples, a server or a user's computer.

The exemplary computer system 164 includes a processing device or processor 166, a main memory 168 (as non-limiting examples, read-only memory (ROM), flash memory, dynamic random access memory (DRAM) such as synchronous DRAM (SDRAM), etc.), and a static memory 170 (as non-limiting examples, flash memory, static random access memory (SRAM), etc.), which may communicate with each other via a bus 172. Alternatively, the processing device 166 may be connected to the main memory 168 and/or the static memory 170 directly or via some other connectivity means.

The processing device 166 represents one or more processing devices such as a microprocessor, central processing unit (CPU), or the like. More particularly, the processing device 166 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 166 is configured to execute processing logic in instructions 174 and/or cached instructions 176 for performing the operations and steps discussed herein.

The computer system 164 may further include a communications interface in the form of a network interface device 178. It also may or may not include an input 180 to receive input and selections to be communicated to the computer system 164 when executing the instructions 174, 176. It also may or may not include an output 182, including but not limited to display(s) 184. The display(s) 184 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 164 may or may not include a data storage device 186 that includes using drive(s) 188 to store the functions described herein in a computer-readable medium 190, on which is stored one or more sets of instructions 192 (e.g., software) embodying any one or more of the methodologies or functions described herein. The functions can include the methods and/or other functions of the processing system 162, a participant user device, and/or a licensing server, as non-limiting examples. The one or more sets of instructions 192 may also reside, completely or at least partially, within the main memory 168 and/or within the processing device 166 during execution thereof by the computer system 164. The main memory 168 and the processing device 166 also constitute machine-accessible storage media. The instructions 174, 176, and/or 192 may further be transmitted or received over a network 194 via the network interface device 178. The network 194 may be an intra-network or an inter-network.

While the computer-readable medium 190 is shown in an exemplary embodiment to be a single medium, the term "machine-accessible storage medium" should be taken to include a single medium or multiple media (as non-limiting examples, a centralized or distributed database, and/or associated caches and servers) that store one or more sets of instructions. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for verifying privacy of a Web Real-Time Communications (WebRTC) media channel, comprising:

establishing, by a first WebRTC client executing on a first computing device and a second WebRTC client executing on a second computing device, a WebRTC media channel between the first WebRTC client and the second WebRTC client using a keying material;

establishing, using the same keying material, a WebRTC data channel between the first WebRTC client and the second WebRTC client corresponding to the WebRTC media channel;

negotiating, in the WebRTC data channel, a cryptographic key exchange between the first WebRTC client and the second WebRTC client;

generating a first Short Authentication String (SAS) and a second SAS based on the cryptographic key exchange in the WebRTC data channel; and displaying the first SAS via the first WebRTC client and the second SAS via the second WebRTC client, such that a mismatch between the first SAS and the second SAS indicates an existence of a man-in-the-middle (MitM) attacker.

2. The method of claim 1, wherein the WebRTC data channel is established prior to establishing the WebRTC media channel.

3. The method of claim 1, further comprising comparing a first fingerprint corresponding to a keying material for establishing the WebRTC media channel with a second fingerprint corresponding to a keying material for establishing the WebRTC data channel, such that a mismatch between the first fingerprint and the second fingerprint indicates the existence of the MitM attacker.

4. The method of claim 1, further comprising, responsive to a match between the first SAS and the second SAS, re-keying the WebRTC media channel based on the cryptographic key exchange in the WebRTC data channel.

5. The method of claim 1, further comprising:
caching cryptographic key material created by the first WebRTC client and the second WebRTC client during the cryptographic key exchange;
signing a third SAS and a fourth SAS generated in a subsequent cryptographic key exchange between the first WebRTC client and the second WebRTC client using the cached cryptographic key material; and
automatically comparing the third SAS and the fourth SAS based on the cached cryptographic key material, such that a mismatch between the third SAS and the fourth SAS indicates the existence of the MitM attacker.

6. The method of claim 5, wherein caching the cryptographic key material comprises:
storing a first derivation of the cryptographic key material in a first persistent data store by the first WebRTC client; and
storing a second derivation of the cryptographic key material in a second persistent data store by the second WebRTC client.

7. The method of claim 1, wherein negotiating the cryptographic key exchange between the first WebRTC client and the second WebRTC client comprises negotiating a key exchange based on a digital signature provided by an Identity Provider.

8. The method of claim 1, wherein the cryptographic key exchange comprises a key exchange based on a public key cryptographic algorithm.

9. The method of claim 8, wherein the public key cryptographic algorithm comprises a Diffie-Hellman key exchange.

10. A system for verifying privacy of a Web Real-Time Communications (WebRTC) media channel, comprising:
at least one communications interface;
a first computing device associated with the at least one communications interface and comprising a first WebRTC client, the first WebRTC client comprising a first WebRTC privacy verification agent; and
a second computing device associated with the at least one communications interface and comprising a second WebRTC client, the second WebRTC client comprising a second WebRTC privacy verification agent;
the first WebRTC client and the second WebRTC client configured to establish a WebRTC media channel between the first WebRTC client and the second WebRTC client using a keying material; and
the first WebRTC privacy verification agent and the second WebRTC privacy verification agent configured to:
establish, using the same keying material, a WebRTC data channel between the first WebRTC client and the second WebRTC client corresponding to the WebRTC media channel;
negotiate, in the WebRTC data channel, a cryptographic key exchange between the first WebRTC client and the second WebRTC client;
generate a first Short Authentication String (SAS) and a second SAS based on the cryptographic key exchange in the WebRTC data channel; and
display the first SAS via the first WebRTC client and the second SAS via the second WebRTC client, such that a mismatch between the first SAS and the second SAS indicates an existence of a man-in-the-middle (MitM) attacker.

11. The system of claim 10, wherein the first WebRTC privacy verification agent and the second WebRTC privacy verification agent are configured to establish the WebRTC data channel prior to the first WebRTC client and the second WebRTC client establishing the WebRTC media channel.

12. The system of claim 10, wherein the first WebRTC privacy verification agent and the second WebRTC privacy verification agent are further configured to compare a first fingerprint corresponding to a keying material for establishing the WebRTC media channel with a second fingerprint corresponding to a keying material for establishing the WebRTC data channel, such that a mismatch between the first fingerprint and the second fingerprint indicates the existence of the MitM attacker.

13. The system of claim 10, wherein the first WebRTC client and the second WebRTC client are further configured to, responsive to a match between the first SAS and the second SAS, re-key the WebRTC media channel based on the cryptographic key exchange in the WebRTC data channel.

14. The system of claim 10, wherein the first WebRTC privacy verification agent and the second WebRTC privacy verification agent are further configured to:
cache cryptographic key material created by the first WebRTC privacy verification agent and the second WebRTC privacy verification agent during the cryptographic key exchange;
sign a third SAS and a fourth SAS generated in a subsequent cryptographic key exchange between the first WebRTC client and the second WebRTC client using the cached cryptographic key material; and
automatically compare the third SAS and the fourth SAS based on the cached cryptographic key material, such that a mismatch between the third SAS and the fourth SAS indicates the existence of the MitM attacker.

15. The system of claim 14, wherein the first WebRTC privacy verification agent and the second WebRTC privacy verification agent are configured to cache the cryptographic key material by:

storing a first derivation of the cryptographic key material in a first persistent data store by the first WebRTC privacy verification agent; and storing a second derivation of the cryptographic key material in a second persistent data store by the second WebRTC privacy verification agent.

16. A non-transitory computer-readable medium having stored thereon computer-executable instructions to cause a processor to implement a method, comprising:

establishing a Web Real-Time Communications (WebRTC) media channel between a first WebRTC client and a second WebRTC client using a keying material;

establishing, using the same keying material, a WebRTC data channel between the first WebRTC client and the second WebRTC client corresponding to the WebRTC media channel;

negotiating, in the WebRTC data channel, a cryptographic key exchange between the first WebRTC client and the second WebRTC client;

generating a first Short Authentication String (SAS) and a second SAS based on the cryptographic key exchange in the WebRTC data channel; and displaying the first SAS via the first WebRTC client and the second SAS via the second WebRTC client, such that a mismatch between the first SAS and the second SAS indicates an existence of a man-in-the-middle (MitM) attacker.

17. The non-transitory computer-readable medium of claim 16 having stored thereon the computer-executable instructions to cause the processor to implement the method, wherein the WebRTC data channel is established prior to establishing the WebRTC media channel.

18. The non-transitory computer-readable medium of claim 16 having stored thereon the computer-executable instructions to cause the processor to implement the method, further comprising comparing a first fingerprint corresponding to a keying material for establishing the WebRTC media channel with a second fingerprint corresponding to a keying material for establishing the WebRTC data channel, such that a mismatch between the first fingerprint and the second fingerprint indicates the existence of the MitM attacker.

19. The non-transitory computer-readable medium of claim 16 having stored thereon the computer-executable instructions to cause the processor to implement the method, further comprising re-keying the WebRTC media channel based on the cryptographic key exchange in the WebRTC data channel, responsive to a match between the first SAS and the second SAS.

20. The non-transitory computer-readable medium of claim 16 having stored thereon the computer-executable instructions to cause the processor to implement the method, further comprising:

caching cryptographic key material created by the first WebRTC client and the second WebRTC client during the cryptographic key exchange;

signing a third SAS and a fourth SAS generated in a subsequent cryptographic key exchange between the first WebRTC client and the second WebRTC client using the cached cryptographic key material; and automatically comparing the third SAS and the fourth SAS based on the cached cryptographic key material, such that a mismatch between the third SAS and the fourth SAS indicates the existence of the MitM attacker.

* * * * *